Patented Aug. 31, 1954

2,687,965

UNITED STATES PATENT OFFICE 2,687,965

CORROSION PREVENTIVE COMPOSITION

Knapel F. Schiermeier, Alton, Ill., assignor to Shell Development Company, San Francisco, Calif., a corporation of Delaware No Drawing. Application May 1, 1950,
Serial No. 159,389

12 Claims. (Cl. 106—14)

This invention relates to an all-purpose corrosion-inhibiting composition. More particularly, this invention pertains to corrosion-inhibiting compositions having the ability of forming on metal surfaces a tenacious protective film, which is impervious to moisture and other contaminants.

It is well known that moisture, corrosive fluids and gases, e. g., $H_2S$, $SO_2$, etc., readily attack not only metallic surfaces but non-metallic surfaces and cause corrosion, rusting, pitting and other damage to such surfaces. Also, aqueous solutions when in contact with a metallic surface readily attack it and cause corrosion and rusting. Under certain conditions, the problem of corrosion becomes exceedingly serious because once started, it becomes progressively accelerated.

Under conditions where, in addition to those enumerated, elevated temperature is encountered, corrosion activity is greatly accelerated. Thus, moisture, salt sprays and other contaminants or acidic composition products and corrosive gases formed during operation of engines, such as internal combustion engines, diesel engines, aircraft engines, turbines and various other machinery and industrial equipment, readily attack and rust or corrode contacting metal surfaces. The damage thus caused is not to the metal surface alone, for rust particles frequently break off and enter the circulating system of engines and cause plugging, clogging, and fouling of conduit lines, columns, plates, and the lines of cracking equipment, tubes, evaporators, etc.

Corrosion of alloyed bearings and other alloyed surfaces due to contact with water can attain such an aggravated stage as to cause great fatigue stresses to be set up, which ultimately result in cracking of the metal.

The problem is equally serious when combating rusting and corrosion of steel drums and storage tanks and the like. Moisture adhering to pickled steel, quenched steel, equipment such as instruments, engine starters and generators on landing crafts, hydraulic systems, machinery for metal processing and the like are also extremely susceptible to corrosion and must be protected. The problem is particularly serious when metallic parts, machines, e. g., aircrafts and the like are transported over bodies of salt water over long periods of time under humid and high temperature conditions. Unless the metal surfaces are protected with a coating composition which is impervious to active corrosion-producing agents serious and damaging corrosion sets in.

Countless materials and compositions have been tried for protecting surfaces by forming on said surfaces non-reacting corrosion protective films of the character of lubricating oils. Metal surfaces have been coated or treated with greases, fatty compositions, waxes, organic compounds, e. g., organic acids, amines; inorganic compounds and the like in order to protect them against corrosion. In almost all cases where no chemical reaction occurred between the surface treated and the corrosion or rust inhibitor, very little benefit was derived. This is due to the fact that non-chemical reactive inhibitors are incapable of penetrating the surface being protected. In cases where such inhibitors are able to form protective coatings on surfaces, they are easily displaced by moisture or rupture readily. They are relatively ineffective against corrosive acidic materials and gases such as are formed during operation of combustion and turbine engines and are easily destroyed when applied to surfaces which are subjected to high temperatures.

It has now been discovered that various metallic surfaces can be protected against corrosion by coating said surfaces with a composition comprising a major amount of a mixture in substantially equal portions of a particular type of petroleum resin which will be hereinbelow fully described and identified and a light liquid hydrocarbon having a boiling point below about 650° F., said mixture having incorporated therein a minor amount, generally not exceeding about 25% and preferably being present in an amount of from 5 to 15% of fixed fatty oil or fat and/or fractions thereof, which product is preferably present in its polymerized, hydrogenated and/or blown state.

The petroleum resins which constitute an important component of compositions of this invention are obtained by the propane extraction of petroleum oil residuums. These petroleum resins may be obtained from paraffinic, mixed base or naphthenic base stocks after said stocks have been de-asphaltized and the de-asphaltized residuum fractions of the above base stocks or mixture thereof have been given a liquid propane treatment to effect de-resining. The de-resining process can be effected by use of propane alone or in conjunction with solvents such as cresylic acid, phenol and the like.

The preferred residue fractions from which the petroleum resins are obtained which are particularly suitable in compositions of this invention are paraffinic oils. The petroleum resins are readily obtained from de-waxed, de-asphaltized oils by treatment of such oils with liquid propane in proportions of about one volume of the oil to about ten volumes of the liquid propane. The mixture is heated to above 100° F. but not to a temperature exceeding the critical temperature of propane. The petroleum resins under the above conditions are precipitated and recovered by suitable means. The petroleum resin can be fractionated, if desired, by dissolving the resins in propane and passing the solution through settlers at various temperatures. The resin recovered from each settler by depropanization can be used as a constituent of compositions of this invention or the fractions combined in order to obtain a desired consistency from mixture of resins which might be particularly suitable for coating and protecting certain metals under a particular adverse set of conditions. Instead of fractionating the petroleum resin, the entire resinous product can be used in compositions of this invention.

The propane-precipitated petroleum resins and fractions thereof consist of colored bodies and hydrocarbons such as paraffinic and naphthenic hydrocarbons of high molecular weight with high carbon-to-hydrogen ratios. The molecular weight of the resins is generally above 1,000, and the iodine number is relatively low (60–80 Wijs method). The resins are readily adsorbed by clays and earths which are used in the refining of petroleum lubricating oils and may be recovered from said adsorbents by use of solvents such as benzene. The resins can be further identified by their solubility in petroleum ethers, and also by the fact that they are not oxidized or combined with sulfur. The resins have viscosities upwards of 400 SUS at 210° F. to around 6,000 SUS at 210° F. and a high viscosity index of over 60.

Typical paraffinic petroleum resins obtained by the above process exhibited the following properties:

| Properties | Petroleum Resins | | |
|---|---|---|---|
| | 1 | 2 | 3 |
| Gravity ° API | 13.2 | 17.3 | 21.4 |
| Flash ° F | 635 | 635 | 620 |
| Fire ° F | 740 | 720 | 720 |
| Pour ° F | 60 | 45 | 25 |
| Visc. at 210° F. (SUS) | 5,587 | 1,818 | 818 |
| VI | | 94 | 98 |
| Carbon residue, wt. percent | 14.66 | 8.76 | 5.29 |

Petroleum resins obtained from Bradford, Pennsylvania, stocks had the following properties:

| Properties | Petroleum Resins | |
|---|---|---|
| | 1 | 2 |
| Gravity ° API | 16.1 | 19.4 |
| Flash ° F | 635 | 635 |
| Visc. at 210° F. (SUS) | 3,860 | 1,151 |
| Carbon residue, Wt. percent | 12.5 | 7.9 |

The petroleum resins can be obtained from the petroleum stocks by means other than propane treatment provided the resins possess properties enumerated above. The petroleum resins can be subjected to polymerization, hydrogenation and the resultant products used as components of composition of this invention. The resins are generally used in amounts of above 50% and preferably can be varied from 55% to 75% of the composition.

The second primary component of compositions of this invention is a light liquid petroleum hydrocarbon boiling below the lubricating oil range and preferably boiling below 650° F. Such petroleum fractions include kerosene, mineral seal oil, gas oil, various petroleum naphtha cuts, mineral spirits, kerosene SO₂ extract, aromatic solvents, petroleum ethers, liquid paraffinic hydrocarbons, such as octane, iso-octane, dodecane, olefinic polymers, cycloparaffinic, e. g., cyclohexane, methylcyclohexane and the like. The low boiling liquid hydrocarbons can be used in amounts varying from 15 to 40% of the composition.

The third essential ingredient which must be present in compositions of this invention in an amount sufficient to impart flexibility to the composition comprises one or more blown fatty oils derived from fatty oils preferably of the semi-drying type by blowing air or other oxygen-rich gas through said oils at an elevated temperature.

Specifically, the fatty oils which are particularly suitable for use in compositions of this invention are: corn oil, cottonseed oil, Kapoc oil, rapeseed oil, Ravison oil, sesame oil, soya bean oil, sunflower oil, teaseed oil, rice bran oil, maize oil, as well as semi-drying fish and marine oils, such as whale oil and the like, or mixtures of such oils. These oils may be oxidized by such means as are disclosed in the following United States Patents: 1,863,004, 2,043,923, 2,156,226, 2,186,910, and 2,216,222. If desired, mixtures of oxidized fatty oils with minor proportions not more than 0.1% in weight, of non-oxidized fatty oils can be used as well as mixtures of the oxidized fatty oils and fatty oils which have been subjected to hydrogenation and/or voltolization treatment. It is to be understood, however, that blown drying-oils such as linseed oil or blown non-drying oils, such as tallow, are not included within the scope of the blown fatty oils used in compositions of the present invention. However, minute amounts of non-drying oils such as tallow, lard oil, castor oil, palm oil, and the like, can be admixed with compositions of this invention, if desirable.

A general formula of this invention may be represented as follows and identified as Base A:

| Essential Components | Weight (Percent) |
|---|---|
| Blown and/or polymerized fixed oil and/or derivative thereof | 10–20 |
| Light liquid hydrocarbon boiling below 650° F | 15–35 |
| Sulfonate amine, nitrates, esters, etc.[1] | 0.5 |
| Petroleum resin | Balance |

[1] Optional additives—the other components are essential.

Specific examples of base A compositions of this invention are:

*Composition I*

Percent
Propane precipitated petroleum resin _____ 55
Mineral spirits _____ 30
Blown rapeseed oil _____ 15

Properties of Composition I are as follows:
Gravity, API _____ 16.7
Flash, PMCC _____ 110
Pour point, °F _____ −5
Visc. at 100° F. (SUS) _____ 2952
Neut. No _____ 0.43
Sapon. No _____ 30.9

*Composition II*

Percent
Propane precipitated petroleum resin _____ 55
Mineral spirits _____ 30
Polymerized fish oil _____ 15

*Composition III*

Percent
Petroleum resin (Mol. Wt. 1000) _____ 50
Mineral spirits _____ 30
Blown rapeseed oil _____ 20

Properties of Composition III are as follows:

Gravity, API _____ 17.4
Flash, PMCC _____ 135
Pour point, °F _____ —20
Visc. at 100° F. (SUS) _____ 2134

*Composition IV*

| | Percent |
|---|---|
| Petroleum resin (Mol. Wt. 1000-1500) | 50 |
| Liquid petroleum hydrocarbon (50-100/100° F.) | 30 |
| Blown soya bean oil | 15 |
| Na petroleum sulfonate | 5 |

*Composition V*

| | Percent |
|---|---|
| Petroleum resin (Mol. Wt. 1000-1500) | 50 |
| Liquid petroleum hydrocarbon (50-100/100° F.) | 30 |
| Blown rapeseed oil | 15 |
| Na petroleum sulfonate | 3 |
| Glycerol monooleate | 2 |

Base A, as well as the specific Compositions I to V, which exemplify base A are excellent coating compositions which dry to hard, thin films resembling paint and possess outstanding rust-preventive properties, particularly for protection of metal surfaces against exposure under severe conditions. These coatings possess a distinct advantage over paint in that they can be easily removed from a surface by use of suitable solvents. Additionally, coating compositions of this invention prevent penetration by moisture or sea water and are not seriously affected by extreme temperature ranges or by being exposed to sunlight or the elements.

Base A is readily made by pulverizing the petroleum resin, and adding a required amount in small increments to a light liquid hydrocarbon such as mineral spirits at a blending temperature of around about 150° F. under constant agitation. To the base blend the blown fixed oil is added, and the mixture agitated until a homogeneous mass has formed. The blend is then cooled and mineral spirits added to make up the blend to its desired consistency due to loss by evaporation or the like. If desired, base A can be made at room temperature by admixing the above ingredients for a longer period under constant agitation until the homogeneous mass has formed.

Compositions of this invention, identified as base A above and specifically illustrated by Compositions I to V can be blended with other coating and rust-preventive compositions in order to obtain improved products or to impart to semieffective rust-preventive compositions outstanding properties of wider applicability. Thus, for example, applicant's corrosion-inhibiting compositions disclosed in United States Patent 2,485,321 can be greatly improved for certain uses by addition thereto of base A of this invention.

The general formula of base compositions covered in the above-mentioned patent and henceforth identified as base B contains the following components by weight:

| | Broad range, Percent Wt. | Preferred range, Percent Wt. |
|---|---|---|
| Asphaltic bitumen | 35-75 | 40-50 |
| Fixed fatty oil | 0.05-10 | 1-4 |
| Waxy hydrocarbon | 5-25 | 8-15 |
| Light hydrocarbon boiling below the lubricating oil range | 0-70 | 35-45 |

A specific example of a rust-inhibiting composition (henceforth designated as Composition VI) comprises:

| | Percent wt. |
|---|---|
| Low VI asphalt (S. P. 175) | 50 |
| No. 1 lard oil | 2 |
| Short residue petrolatum | 10 |
| Mineral spirits | 38 |

The properties of Composition VI are:

Gravity at 60° F. (API) _____ 28.4
Flash ° F. (PMCC) _____ 104
Visc. at 100° F. (SUS) _____ 741
Pour point ° F _____ —15

Although base B compositions are very good as rust-preventive compositions, they can be greatly improved for certain uses by being admixed with 1 to 4 parts of base A of this invention. The resultant blend henceforth identified as base C results in a product affording excellent protection to metal surfaces. Base C composition dries faster and forms thinner, more transparent coatings on a surface than does base B or compositions covered by base B which are opaque. Base C compositions afford excellent protection to surfaces exposed to outdoors under the most adverse weather conditions. Surfaces protected with base C compositions offer protection to surfaces exposed to sea water, and to metals stored for long periods of time or during overseas shipment.

Base C can be exemplified by Composition VII of this invention, which comprises:

| | Percent |
|---|---|
| Composition VI | 25 |
| Composition I | 37.5 |
| Mineral spirits | 37.5 |

The properties of Composition VII were:

Gravity API _____ 31.3
Flash, C. O. C., ° F _____ 125
Visc. at 100° F. (SUS) _____ 59.5
Pour point, ° F _____ Below —25
Neut. No _____ 0.7
Sapon. No _____ 11.8

Bases A and C can be diluted with substantial amounts of light liquid hydrocarbons in order to obtain final compositions which can be applied with more ease or make the bases in their diluted form more applicable for certain uses. The above bases diluted with from 1 to 5 parts of kerosene, mineral spirits or other liquid hydrocarbons can be used as rust preventives for protection against certain milder conditions such as indoor or sheltered exposure.

In order to determine the protective properties which compositions of this invention possess, metal strips were coated with compositions of this invention and subjected to the following tests:

*Salt spray test*

In this test, polished steel panels which have been coated with a desired product to be evaluated are exposed continuously at a constant temperature (95° or 100° F.) to a salt mist or fog which is produced by the atomization of a 20% sodium chloride solution. The average time until rusting occurs on the faces of the panels is taken as the life of the coating.

*Ultraviolet weathering unit test*

In this test, polished or sand-blasted steel panels which have been coated with a desired product to be evaluated are continuously exposed to intense light from a carbon arc and are intermittently wetted by a fine water spray. The average time until rusting occurs on the faces of the panels is taken as the life of the coating.

*Outdoor exposure test*

In this test, polished steel panels are coated with the product to be evaluated, and the test panels are fastened on uncovered racks at an angle of 45 degrees from the vertical and exposed continuously to the elements until rusting occurs.

*Test results*

| Compositions | Salt Spray Test (Days) | Ultraviolet Weathering Unit Test (Days) | Outdoor Exposure Test (Days) |
| --- | --- | --- | --- |
| Composition I | 10 | 25 | 60 |
| Composition V | 10 | 25 | 60 |
| Composition VI [1] | 10 | 25 | 24 |
| Composition VII [1] | 2 | 30 | 65 |
| Composition X [2] | <1 | 2 | 10 |
| Composition Y [3] | <1 | 5 | 25 |
| Composition Z [4] | 3 hours | 1 | 5 |

[1] Composition VII is superior to Composition VI in drying rates. The former dries to a transparent, hard coating in about 15 minutes while Composition VI requires over 24 hours to dry and is soft and opaque. Also for the same protection, Composition VII requires much thinner film coating than when any of the other compositions are used.
[2] Composition X consists of 15% blown rapeseed oil dispersed in mineral spirits.
[3] Composition Y consists of equal parts of propane precipitated petroleum resin and mineral spirits.
[4] Commercial rust-inhibiting composition containing petroleum sulfonate.

Compositions of this invention may be modified by addition thereto of organic salts, e. g., sulfonates, salicylates, oleates, stearates, sulfated oils; salts of inorganic acids, e. g., metal phosphates, nitrites, chromates; organic esters, e. g., glyceryl monooleate, chloral phosphate, phosphites, etc.

Compositions of this invention may, if desired, be very easily removed by flushing, wiping or any other suitable means. Compositions of this invention may also be applied to non-metallic surfaces which require protection against corrosion, moisture, the elements and the like.

Many modifications and variations of this invention as hereinbefore set forth may be made without departing from the spirit and scope thereof, and therefore only such limitation should be imposed as indicated in the appended claims.

The invention claimed is:

1. A composition of matter adapted for use as a rust inhibitor for metals containing the following constituents in the following proportions:

Percent weight
Non-air blown, propane precipitated petroleum resin _____ 55
Blown rapeseed oil _____ 15
Mineral spirits _____ 30

2. A composition of matter adapted for use as a rust inhibitor for metals containing 1 to 3 parts of composition of claim 1 and 3 to 1 parts of a composition containing the following constituents in the following proportions:

Percent weight
Low VI asphalt (175 S. P.) _____ 50
No. 1 lard oil _____ 2
Short residue petrolatum _____ 10
Mineral spirits _____ 38 said component mixtures being blended into a homogeneous mass and diluted with a substantial amount of a light liquid hydrocarbon.

3. A composition of matter adapted for use as a rust inhibitor for metals containing the following components in the following proportions:

Percent weight
Fixed fatty oil free of drying oil _____ 10–20
Light liquid hydrocarbon boiling below 650° F. _____ 15–35
Non-air blown, propane precipitated petroleum resin _____ Balance 4. A composition of matter adapted for use as a rust inhibitor for metals containing the following components in the following proportions:

Percent weight
Fixed fatty oil free of drying oil _____ 2–20
Light liquid hydrocarbon boiling below 650° F. _____ 5–35
Non-air blown, propane precipitated petroleum resin _____ Balance 5. A composition of matter adapted for use as a rust inhibitor for metals containing 1 to 3 parts of composition of claim 3 and 3 to 1 parts of a composition containing the following constituents in the following proportions:

Percent
Asphaltic bitumen _____ 35–75
Fixed fatty oil free of drying oil _____ 2–10
Waxy hydrocarbon _____ 5–25 said component mixtures being blended into a homogeneous mass and diluted with a substantial amount of a light liquid hydrocarbon.

6. A rust-inhibiting base composition consisting of a non-air blown propane precipitated petroleum resin having incorporated therein from 5% to 25% of blown rapeseed oil, and from 15% to 40% of mineral spirits.

7. A rust-inhibiting base composition consisting of a non-air blown, propane precipitated petroleum resin having incorporated therein from 5% to 25% of blown soya bean oil and from 15% to 40% of mineral spirits.

8. A rust-inhibiting base composition consisting of a non-air blown, propane precipitated petroleum resin having incorporated therein from 5% to 25% of a fixed fatty oil and from 15% to 40% of a light liquid hydrocarbon.

9. A composition of matter for use as a rust inhibitor for metals containing the following constituents in the following proportions:

Percent by weight
Non-air blown, propane precipitated petroleum resin _____ 50
Liquid petroleum hydrocarbon _____ 30
Blown rapeseed oil _____ 15
Sodium petroleum sulfonate _____ 3
Glycerol monooleate _____ 2

10. A composition of matter adapted for use as a corrosion inhibitor for metals containing 1 to 3 parts of composition of claim 9, and 3 to 1 parts of composition containing the following constituents in the following proportions:

Percent by weight
Low VI asphalt (175 S. P.) _____ 50
No. 1 lard oil _____ 2
Short residue petrolatum _____ 10
Mineral spirits _____ 38

11. A composition of matter adapted for use as a rust inhibitor for metal surfaces containing 37.5% of composition of claim 1, 25% of a composition containing the following constituents in the following proportions:

| | Percent by weight |
|---|---|
| Low VI asphalt (175 S. P.) | 50 |
| No. 1 lard oil | 2 |
| Short residue petrolatum | 10 |
| Mineral spirits | 38 | and the balance a light liquid hydrocarbon.

12. A composition of matter adapted for use as a rust inhibitor for metal containing the following constituents in the following proportions:

| | Percent by weight |
|---|---|
| Non-air blown, propane precipitated petroleum resin | 55 |
| Mineral spirits | 30 |
| Polymerized fish oil | 15 |

References Cited in the file of this patent

UNITED STATES PATENTS

| Number | Name | Date |
|---|---|---|
| 2,250,185 | Mohler | July 22, 1941 |
| 2,392,497 | O'Neill | Jan. 8, 1946 |
| 2,485,321 | Schiermeier | Oct. 18, 1949 |
| 2,545,137 | David | Mar. 13, 1951 |
| 2,560,202 | Zimmer et al. | July 10, 1951 |
| 2,596,101 | Pritzker | May 13, 1952 |